US010781687B2

(12) United States Patent
Huang

(10) Patent No.: US 10,781,687 B2
(45) Date of Patent: Sep. 22, 2020

(54) ELECTRICAL IMPEDANCE TOMOGRAPHY USING A SWITCHABLE ARRAY

(71) Applicant: Halliburton Energy Services, Inc., Houston, TX (US)

(72) Inventor: Wei Hsuan Huang, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 53 days.

(21) Appl. No.: 15/771,767

(22) PCT Filed: Dec. 16, 2015

(86) PCT No.: PCT/US2015/066063
§ 371 (c)(1),
(2) Date: Apr. 27, 2018

(87) PCT Pub. No.: WO2017/105432
PCT Pub. Date: Jun. 22, 2017

(65) Prior Publication Data
US 2018/0347341 A1    Dec. 6, 2018

(51) Int. Cl.
*G01R 27/02* (2006.01)
*E21B 47/113* (2012.01)
(Continued)

(52) U.S. Cl.
CPC ............ *E21B 47/113* (2020.05); *E21B 47/10* (2013.01); *G01F 1/64* (2013.01); *G01F 1/74* (2013.01);
(Continued)

(58) Field of Classification Search
CPC ........ A61B 6/032; A61N 7/00; G01N 23/046; G01N 2223/501; G01N 2223/419
See application file for complete search history.

(56) References Cited

U.S. PATENT DOCUMENTS 5,162,740 A    11/1992  Jewell
5,284,142 A    2/1994   Goble et al.
(Continued)

FOREIGN PATENT DOCUMENTS

EP    0235478    9/1987
EP    2418478    2/2012
(Continued)

OTHER PUBLICATIONS

International Search Report and Written Opinion for PCT/US2015/066063 dated Jun. 17, 2016.
(Continued)

*Primary Examiner* — Alesa Allgood
(74) *Attorney, Agent, or Firm* — Jason Sedano; C. Tumey Law Group PLLC

(57) ABSTRACT

An electrical impedance tomography based flow monitoring system includes a flow accepting pipe having a cylindrical grid of m×n electrodes, wherein m is an integer greater than 3 representing a number of circumferential grid positions and n is an integer greater than 2 representing a number of axial grid positions. Each combination of adjacent circumferential grid positions and adjacent axial grid positions defines a cell having four electrodes electrically connectable in various combinations by a switch, and the switches are set to connect the electrodes into multiple axially-extending arrays. The system further comprises a controller coupled to the multiple axially-extending arrays to acquire multi-point electrical tomography measurements, wherein the controller processes the measurements to derive a monitored quantity.

18 Claims, 7 Drawing Sheets

(51) Int. Cl.
- *G01V 3/20* (2006.01)
- *G01N 27/02* (2006.01)
- *G01F 1/64* (2006.01)
- *E21B 47/10* (2012.01)
- *G01F 1/74* (2006.01)
- *E21B 47/18* (2012.01)

(52) U.S. Cl.
CPC ............... *G01N 27/02* (2013.01); *G01V 3/20* (2013.01); *E21B 47/18* (2013.01)

(56) References Cited

U.S. PATENT DOCUMENTS

| | | | |
|---|---|---|---|
| 5,485,743 | A | 1/1996 | Taherian et al. |
| 6,046,593 | A | 4/2000 | Eisenmann et al. |
| 6,060,886 | A | 5/2000 | Tabarovsky et al. |
| 6,147,497 | A | 11/2000 | Berryman et al. |
| 6,714,014 | B2 | 3/2004 | Evans et al. |
| 6,940,286 | B2 | 9/2005 | Wang et al. |
| 6,978,672 | B1 | 12/2005 | Chen et al. |
| 7,170,294 | B2 | 1/2007 | Kasevich |
| 7,579,841 | B2 | 8/2009 | San Martin et al. |
| 7,847,565 | B2 | 12/2010 | Woo et al. |
| 8,054,094 | B1 | 11/2011 | Langoju et al. |
| 8,508,238 | B2 | 8/2013 | Mahalingam et al. |
| 8,536,883 | B2 | 9/2013 | Xie et al. |
| 8,760,167 | B2 | 6/2014 | Bloenmenkamp |
| 8,766,641 | B2 | 7/2014 | Pindiprolu et al. |
| 10,086,200 | B2 * | 10/2018 | Suaning .............. A61N 1/36046 |
| 2004/0130338 | A1 | 7/2004 | Wang et al. |
| 2011/0267074 | A1 | 11/2011 | Xie et al. |
| 2013/0069656 | A1 | 3/2013 | Haramboure et al. |
| 2014/0191120 | A1 | 7/2014 | Donderici et al. |
| 2014/4018841 | | 7/2014 | Dong et al. |

FOREIGN PATENT DOCUMENTS

| | | | |
|---|---|---|---|
| EP | 2418478 A1 * | 2/2012 | ........... A61B 5/0536 |
| WO | 0165212 | 9/2001 | |
| WO | 2014177654 | 11/2014 | |
| WO | 2013147758 | 10/2016 | |

OTHER PUBLICATIONS

"Electrical impedance tomography" Borcea 2002.
"Impedance Tomography" Malmivuo et al. dated 1995.
"Measurement of Density and Velocity in Hydraulic Transport using Tomography" Ma et al. Dated Oct. 2002.
"Electrochemical Impedance Spectroscopy and Its Applications" Lasia 1999.
"Analysis and design of helical capacitance sensors for volume fraction determination", M.S.A. Albouelwafa et al. dated Jul. 1979.
European Search Report for Application No. EP 15910907 dated Oct. 11, 2018.
"High Resolution Downhole Measurements of Porosity and Fluid Saturation While Core Drilling" 2002, Bonnecaze et al.

* cited by examiner

ELECTRICAL IMPEDANCE TOMOGRAPHY USING A SWITCHABLE ARRAY

BACKGROUND

During drilling and the production of oil and gas, it is often difficult to monitor various flows of fluids and other material, especially through pipes and conduits, making it challenging to estimate production, predict and troubleshoot problems, and provide reliable data on which to base decisions. For example, real-time measurements of the volume and velocities of oil, gas, and water moving through the production system are desirable because such measurements provide a good picture of the overall status or profitability of the production system.

The difficulties arise because many materials in different phases flow simultaneously through various pipes. Ideally for measurement purposes, the liquids, gases, and solids would be mixed together evenly and flowing at the same rate within the pipe. However, sometimes there is separation between gases and liquids with the liquids moving at a slower speed than the gases. Sometimes gases travel along the center of a vertical pipe while liquids travel along the pipe wall. There are many variations of such flow regimes, which makes measurement of the volume and velocities difficult. Other measurements are also difficult to obtain, such as the spatial distributions of the flowing materials, location of material boundaries, and relative velocities between the materials. The difficulty in obtaining these measurements results in poor control of production processes and inefficiency in the use of existing equipment.

One approach to this measurement problem employs electrical impedance tomography (EIT) to map the spatial distribution of materials within the pipe. The principles of EIT are based on the understanding that materials have variations in electrical properties due to different characteristics such as density or chemical composition. These electrical properties, such as electrical conductivity and electric permittivity, determine the behavior of the materials under the influence of electric fields. For example, dielectric materials have a high electric permittivity, and alternating currents flow easily through them. Conductive materials have a high electrical conductivity, and both direct and alternating currents flow easily through them. EIT employs a fixed electrode arrangement around the pipe to supply interrogation currents and measure the responses of the material sufficient to derive the desired measurements, so long as certain assumptions about the flow regime are satisfied. Unfortunately, the actual flow regime can deviate from those assumptions, particularly in regions near valves and sharp bends.

BRIEF DESCRIPTION OF THE DRAWINGS

Accordingly, electrical impedance tomography systems and methods using a switchable array is disclosed herein. In the following detailed description of the various disclosed embodiments, reference will be made to the accompanying drawings in which.

Figure 1:
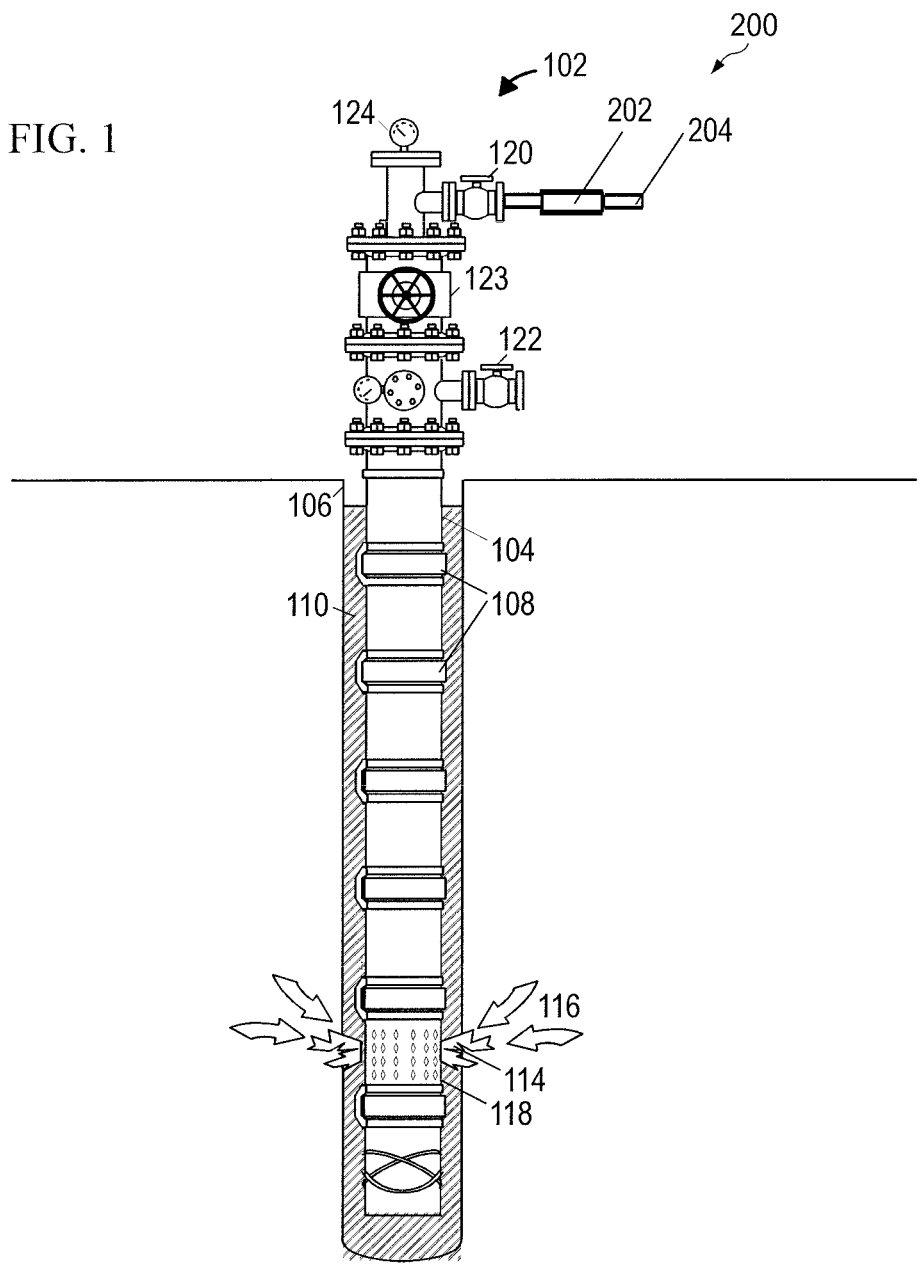
FIG. 1 is a contextual view of an illustrative production well.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

Notation and Nomenclature

Certain terms are used throughout the following description and claims to refer to particular system components and configurations. As one of ordinary skill will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical or physical connection. Thus, if a first device couples to a second device, that connection may be through a direct electrical connection, through an indirect electrical connection via other devices and connections, through a direct physical connection, or through an indirect physical connection via other devices and connections in various embodiments.

DETAILED DESCRIPTION

The issues identified in the background are at least partly addressed by electrical impedance tomography (EIT) systems and methods using a switchable array. For example, this technology can be used to monitor drilling fluid in anticipating potential blow outs by monitoring the phases in the annular fluid into the mud pool. FIG. 1 is a contextual view of a production well 102 including a switchable array of electrodes 202 surrounding a pipe 204 that make up an EIT system that is described in detail with respect to the subsequent figures. Though FIG. 1 shows a vertical well, the concepts disclosed herein apply to horizontal and deviated wells and indeed, to any source of flowable materials. The well 102 includes a casing string 104 positioned in a borehole 106 that has been formed in the earth by a drill bit. The casing string 104 includes multiple casing tubulars (e.g., 30 foot long steel tubulars) connected end-to-end by couplings 108. Alternative casing types include continuous tubing and, in some cases, composite (e.g., fiberglass) tubing. Cement 110 has been injected between an outer surface of the casing string 104 and an inner surface of the borehole 106 and allowed to set. The cement 110 enhances the structural integrity of the well 102 and seals the annulus around the casing against undesired fluid flows.

Perforations 114 have been formed at one or more positions along the borehole 106 to facilitate the flow of a fluid 116 from the surrounding formation into the borehole and then to the surface. The casing string 104 may include pre-formed openings 118 in the vicinity of the perforations 114, or it may be perforated at the same time as the formation. The well 102 is equipped with a production tubing string positioned in an inner bore of the casing string 104. One or more openings in the production tubing string accept the borehole fluids and convey them to the surface and onward to storage and/or processing facilities via a production outlet 120. The wellhead includes other ports such as a port 122 for accessing the annular space(s) and a blowout preventer 123 for blocking flows under emergency conditions. Various other ports and feed-throughs are generally included to enable the use of external sensors 124 and internal sensors.

A pipe 204 is coupled to the production outlet 120 with a switchable array of electrodes 202 penetrating the pipe walls or capacitively coupled to its interior. To facilitate the EIT analysis, the pipe 204 may be formed from a nonconductive material or may be insulated along its interior. Conductive (metal) pipe 204 can also be employed, with the electrodes being suitably insulated to avoid short circuiting through the pipe wall. The switchable array 202 extends around the circumference of the pipe, forming an EIT system 200 described and illustrated in the subsequent figures. The switchable array of electrodes 202 may be inserted along any type of pipe or conduit of flowing materials, e.g., a feed pipe that transports drilling fluid to the drill string, a pipe that transports drilling fluid away from an annulus, a casing pipe, and the like.

Figure 7:
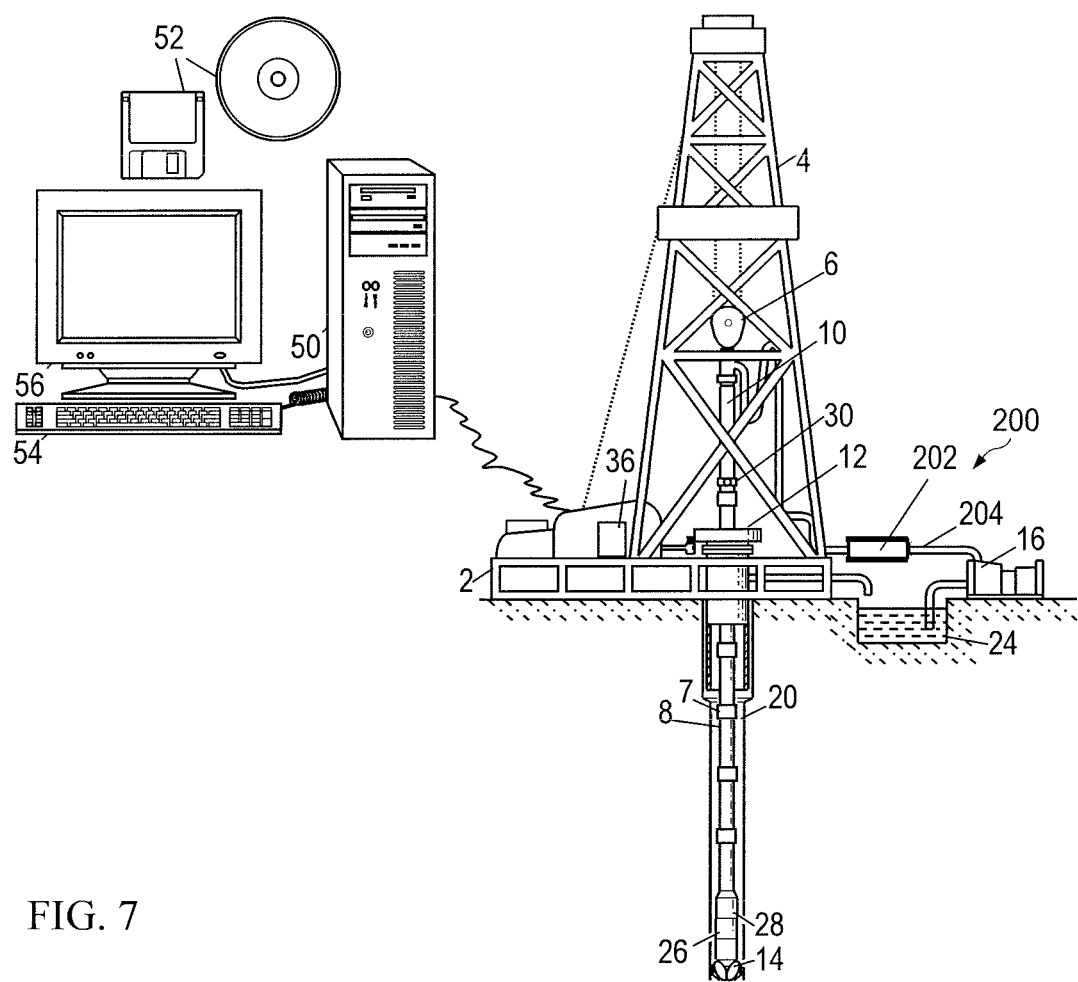
FIG. 7 is a contextual view of an illustrative drilling environment.

FIG. 7 shows an illustrative drilling environment with an EIT system 200 including a switchable array of electrodes 202 surrounding a pipe 204. A drilling platform 2 is equipped with a derrick 4 that supports a hoist 6. The platform 2 may also be located offshore for subsea drilling purposes in at least one embodiment. Drilling of oil and gas wells is carried out by a string of drill pipes connected together by "tool" joints 7 so as to form a drill string 8. The hoist 6 suspends a kelly 10 that lowers the drill string 8 through a rotary table 12. Connected to the lower end of the drill string 8 is a drill bit 14. The bit 14 is rotated and drilling is accomplished by rotating the drill string 8, by use of a downhole motor near the drill bit, or by both methods.

Drilling fluid, termed mud, is pumped by mud recirculation equipment 16 through a pipe 204, through the kelly 10, and down through the drill string 8 at high pressures and volumes to emerge through nozzles or jets in the drill bit 14. Accordingly, the switchable array 202 obtains measurement data, such as impedance and flow characteristics, regarding the flow of mud through the pipe 204 as described below. In other embodiments, multiple switchable arrays 202 surround various sections of pipe throughout the drilling environment and obtain measurement data at various locations. The various sections of pipe may be used to transport different materials, and in one embodiment a complete picture of the health of the circulation system of the drilling environment may be obtained.

The mud then travels back up the hole via the annulus formed between the exterior of the drill string 8 and the borehole wall 20, through a blowout preventer, and into a mud pit 24 on the surface. On the surface, the drilling mud is cleaned and then recirculated by recirculation equipment 16.

For a logging while drilling (LWD) environment, downhole sensors 26 are located in the drillstring 8 near the drill bit 14. The sensors 26 may include directional instrumentation and LWD tools. The directional instrumentation measures the inclination angle, the horizontal angle, and the azimuthal angle (also known as the rotational or "tool face"

angle) of the LWD tools. In some embodiments, directional measurements are made as follows: a three axis accelerometer measures the earth's gravitational field vector relative to the tool axis and a point on the circumference of the tool called the "tool face scribe line". (The tool face scribe line is drawn on the tool surface as a line parallel to the tool axis.) From this measurement, the inclination and tool face angle of the LWD tool can be determined. Additionally, a three axis magnetometer measures the Earth's magnetic field vector in a similar manner. From the combined magnetometer and accelerometer data, the horizontal angle of the LWD tool can be determined. In addition, a gyroscope or other form of inertial sensor may be incorporated to perform position measurements and further refine the orientation measurements.

In some embodiments, downhole sensors 26 are coupled to a telemetry transmitter 28 that transmits telemetry signals by modulating the mud flow in drill string 8. A telemetry receiver 30 is coupled to the kelly 10 to receive transmitted telemetry signals. Other telemetry transmission techniques may also be used. The receiver 30 communicates the telemetry to an acquisition module 36 coupled to a data processing system 50. The acquisition module 36 may also obtain measurement data from the switchable array 202. The data processing system 50 may be coupled by a wired connection 49 or wireless connection, and may periodically obtain the measurement data as a function of position and/or time. Among other things, the system 50 processes data received from the acquisition module 36 and generates a representative display for the driller to perceive. For example, the health of the circulation system of the drilling environment may be displayed. Software (represented by information storage media 52) may run on the data processing system 50 to collect the data and organize it in a file or database. Specifically, a processor coupled to memory may execute the software. The software may respond to user input via a keyboard 54 or other input mechanism to display data as an image or movie on a monitor 56 or other output mechanism. The software may process the data as described below. In at least one embodiment, the data processing system 50 is located downhole within a housing able to protect the system 50 from the harsh downhole environment. In another embodiment, processors both at the surface and downhole may work together or independently to obtain, store, and process measurement data.

Figure 2A:
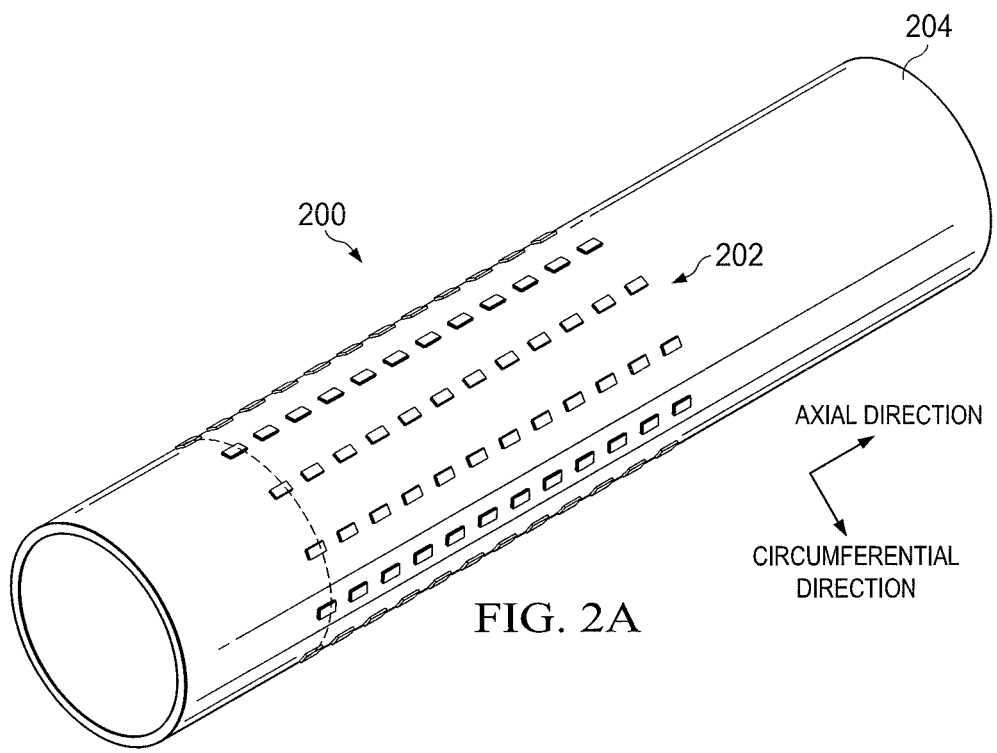
FIG. 2A is a perspective view of an illustrative electrical impedance tomography system with a straight pipe.
Figure 2B:
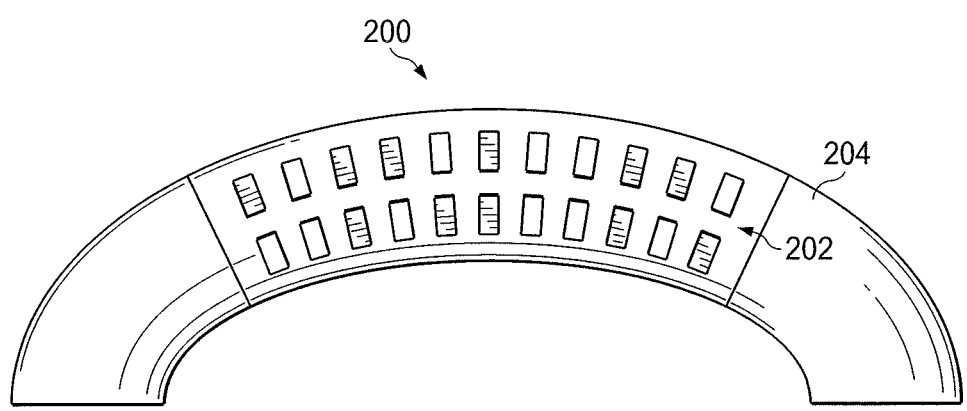
FIG. 2B is a side view of an illustrative electrical impedance tomography system with a curved pipe.

Although the switchable array 202 is shown surrounding a pipe 204 for mud, the switchable array 202 may be used in conjunction with any type of pipe or conduit of flowing materials. FIGS. 2A and 2B describe the switchable array 202 and pipe 204 generally.

FIG. 2A is a perspective view of an illustrative EIT system 200 including a flow accepting pipe 204 having an embedded switchable array of electrodes 202 to measure impedance and flow characteristics of one or more fluids (including mixtures of liquids, gases, and/or solids that flow within the pipe). For example, the fluids may be oil, natural gas, water, cement slurry, drilling fluid, and the like in various phases. In at least one embodiment, the switchable array 202 includes an array of electrodes interconnected by switches and electrical wires to form a flexible mesh or net that conforms to the shape of the pipe 204 as described with respect to FIG. 4. The switchable array of electrodes 202 has a cylindrical grid topology of m×n electrodes, wherein in is an integer greater than 3 representing a number of circumferential grid positions and n is an integer greater than 2 representing a number of axial grid positions in at least one embodiment. In practice, m may often be 8, 10, 12, 16, or more, and n may often be equal to or greater than n.

The electrode grid has a regular pattern within the switchable array 202, which can be characterized in terms of a grid cell having electrodes at each of its four corners and switches that provide configurable interconnections between these four electrodes. These switched electrical interconnections enable the electrodes to be coupled into electrically-connected electrode arrays that (in most cases) extend axially through the grid. A voltage or current can be sensed or supplied on each electrode array via electrical leads that couple the electrode arrays to a controller. In some embodiments, the electrical leads are connected at one end of the axially-extending electrode arrays. In other embodiments, the electrical leads attach to a distributed subset of electrodes to drive the different electrode arrays from different positions along their length. These leads couple a controller to the switchable grid to supply interrogation currents and to acquire voltage measurements for measurement of impedance and flow characteristics of the fluid within the pipe 204 as described with respect to FIG. 3.

At one extreme, each electrode array may follow a path through the switchable array that extends in a straight line, or substantially a straight line, along the axial dimension of the pipe 204. At the other extreme, each electrode array may follow a path through the switchable array 202 that extends straight around the circumference of the pipe 204, defining a circular cross-section of the pipe 204. In between those two extremes, a path may be created in the switchable array 202 that defines a helical (spiral) path around the pipe 204 at a particular helix angle.

The helix angle is the arc tangent of a ratio between the circumferential distance traversed by the helical path and the axial distance traversed by the path. Although we reserve the term "helix" for a path between the two extremes given above, we note that the helix angle would be zero for the straight line along the axial dimension of the grid, and would be 90° for the circular path around the circumference. The distances corresponding to integer multiples of the electrode spacings are natural choices for preferred helix angles, with a path advancing by, e.g., one circumferential position increment for each axial position increment. Contemplated embodiments include paths that advance by two circumferential position increments for every axial position increment, and paths that advance by one circumferential position increment for every two axial position increments. Other helix angles and path shapes are also contemplated, including paths having an initial segment with a first helix angle and a subsequent segment at a second, different helix angle.

In accordance with the EIT methods described further below, it is expected that the switchable array 202 will generally be configured as multiple, axially-extending electrode arrays each following similarly-shaped paths that are circumferentially offset from each other, though other configurations may also be suitable. One of the axially-extending electrode arrays may be driven to ground, with one or more of the other axially-extending electrode arrays being driven with an interrogation current at a frequency that is different from the other interrogation currents, if any. The voltages of the remaining axially-extending electrode arrays may be sensed to acquire the measurements needed for deriving spatial distributions and flow rates of the different flowable materials. Paths with the same helix angle may be adjacent to each other without intersecting, thereby maximizing the number of usable electrode arrays. The non-helical examples include parallel electrode arrays extending in straight lines along the axial direction of the pipe 204. As another example, electrode arrays may extend circumferentially to define parallel circular-cross sections of the pipe 204. The multiple paths may have helix angles that vary in parallel along the axial length of the switchable grid.

FIG. 2B is a side view of an illustrative EIT system 200 with a pipe 204 that is curved. As illustrated, the switchable array 202 conforms to the shape of the pipe 204, including the curvature of the pipe 204. The pipe 204 may be curved to any degree, and the switchable array 202 may even be placed at joints of the pipe 204 such as an elbow joint. Also, the paths of electrode arrays chosen may be based on the shape and curvature of the pipe 204. Specifically, paths may be chosen for a particular shape of cross-section, e.g., circular, elliptical, and the like. Paths may also be chosen for their thickness (e.g., more than one electrode wide), location (e.g., a particular subset of electrodes is desired to be included in the path), and the like.

Figure 3A:
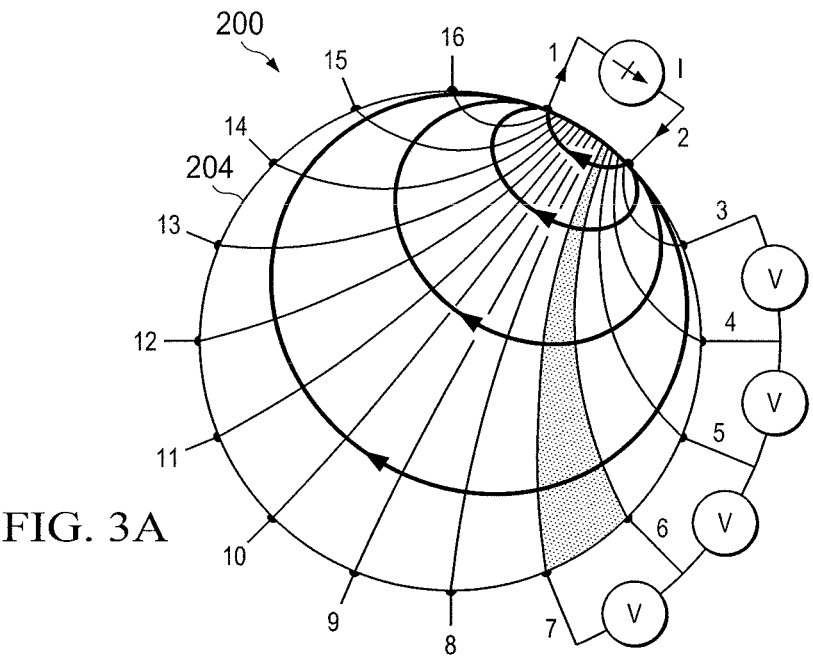
FIGS. 3A and 3B are cross-sectional views of an illustrative electrical impedance tomography system.
Figure 3B:
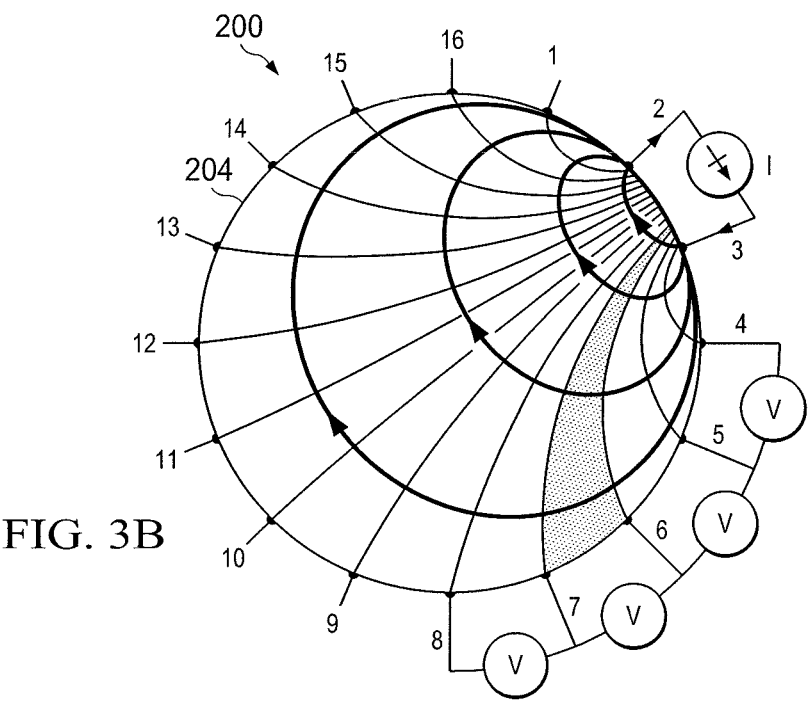

FIGS. 3A and 3B are cross sectional views of an illustrative EIT system 200 with axially-extending electrode arrays labeled 1-16. (The cross-sectional view shows only one electrode from each electrode array.)

The electrode arrays are used to acquire electrical tomography measurements by applying a probe current between two electrode arrays and measuring the voltages across each of the other electrode arrays. Referring to FIG. 3A, an interrogation current of specific frequency and magnitude is applied between electrode arrays 1 and 2. Simultaneously, voltage measurements are taken for each of the other electrode arrays, from which measurements voltage differences between adjacent electrode arrays can be determined. For example, voltage differences are determined between electrode arrays 3-4, 4-5, . . . , and 15-16. When the measurements are recorded, the current injection is cycled to the next pair of adjacent electrode arrays (electrode arrays 2 and 3 as illustrated in FIG. 3B), and voltage measurements are taken again, this time from electrode arrays 4 through 16 and 1. In this way, the current injection electrode pair is cycled around the entire circumference of the pipe 204, and impedance data for each region of the cross-section may be recorded. A similar cycle of measurements may be performed simultaneously for multiple injection electrode array pairs by using different frequencies for each interrogation current.

If multiple EIT measurements are acquired at axially-spaced positions along the pipe, e.g., with multiple EIT systems, their measurements may be cross-correlated to derive the time lag between material flows at the different positions. When combined with a distance between the axially-spaced positions, the flow velocities can be calculated, from which a volumetric flow rate can be determined for each component of the flow. Materials having distinctive impedances and admittivities (or resistances and conductivities) may be identified and such identification may lead to specific known data about those materials being incorporated into flow regime models.

Figure 4:
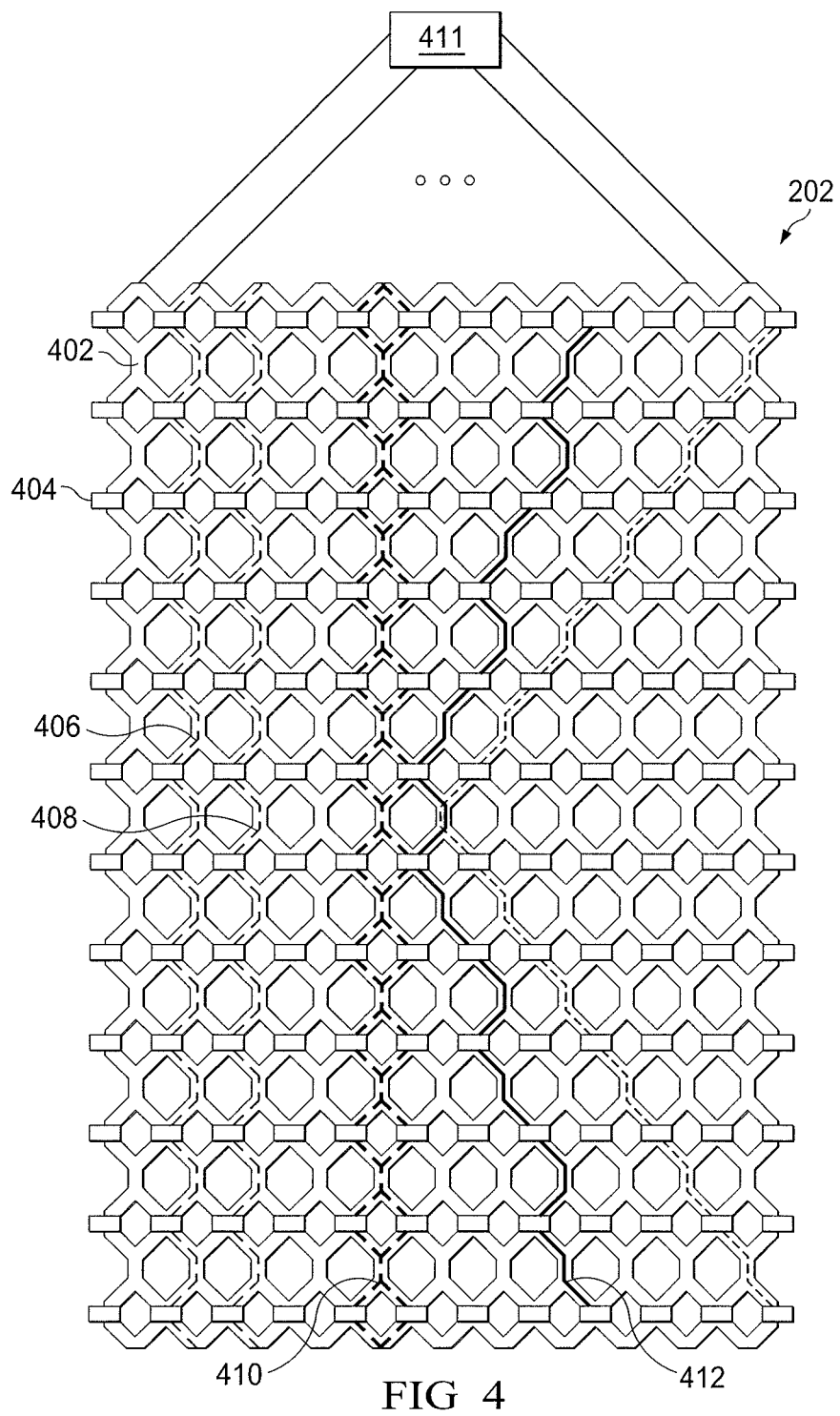
FIG. 4 is a schematic of an illustrative switching network for the electrical impedance tomography apparatus.

FIG. 4 is a schematic of an illustrative switchable array of electrodes 202. The switchable array 202 includes cross-shaped switchable joints 402 coupling four electrodes 404 each to form a grid. As illustrated, the grid includes at least 12 rows and 12 columns of electrodes, however in various other embodiments the grid includes a different number of rows and columns. The switch joints 402 can be configured to connect electrodes 404 into electrode arrays extending along various paths 406, 408, 410, 412 through the switchable array 202. These paths are shown as co-existing in FIG. 4, though in practice it is expected that each electrode array will run parallel to the other electrode arrays. The first two paths 406, 408 are each linear through the array 202 and one electrode wide. A third, thicker, path 410 is also illustrated. The third path 410 is two electrodes wide. In this way, electrode arrays of varying thicknesses may be used to measure the fluids within the pipe. Thicker paths enable averaged measurements or a larger volume of measurement. A fourth, non-linear, path 412 is also illustrated and may prove more suitable for certain flow geometries. In this way, multiple paths 406, 408, 410, 412 having different characteristics may be used to measure impedance and flow characteristic data.

A controller 411 or processor may be coupled to the multiple axially-extending arrays with a wired or wireless connection. As such, the controller 411 or processor may be relatively near or far from the arrays. For example, the controller 411 or processor may be located at the surface, downhole, or both, e.g. two controllers 411 or processors may work together to control the arrays, one downhole and one at the surface. If located downhole, the controller 411 or processor may be located within a housing for protection from the harsh downhole environment. For example, the controller 411 or processor may be located within the drill string for such protection and to be near a tubing around which the arrays are placed.

The controller 411 or processor may acquire the multi-point EIT measurements, invert the EIT measurements, obtain a spatial distribution of distinguishable components of the fluid flow and/or component flow velocities and flow rates, and provide a user interface for display. For example, a two- or three-dimensional map of the spatial distribution may be created and displayed, dividing the pipe into a finite number of regions, each region represented by pixels or voxels suitably colored to indicate the derived impedance and flow characteristics associated with that region. The map may use colors and/or numbers to represent different impedance or flow characteristic variables in order to provide an easy-to-read overall picture of fluid flow within the pipe.

Figure 5:
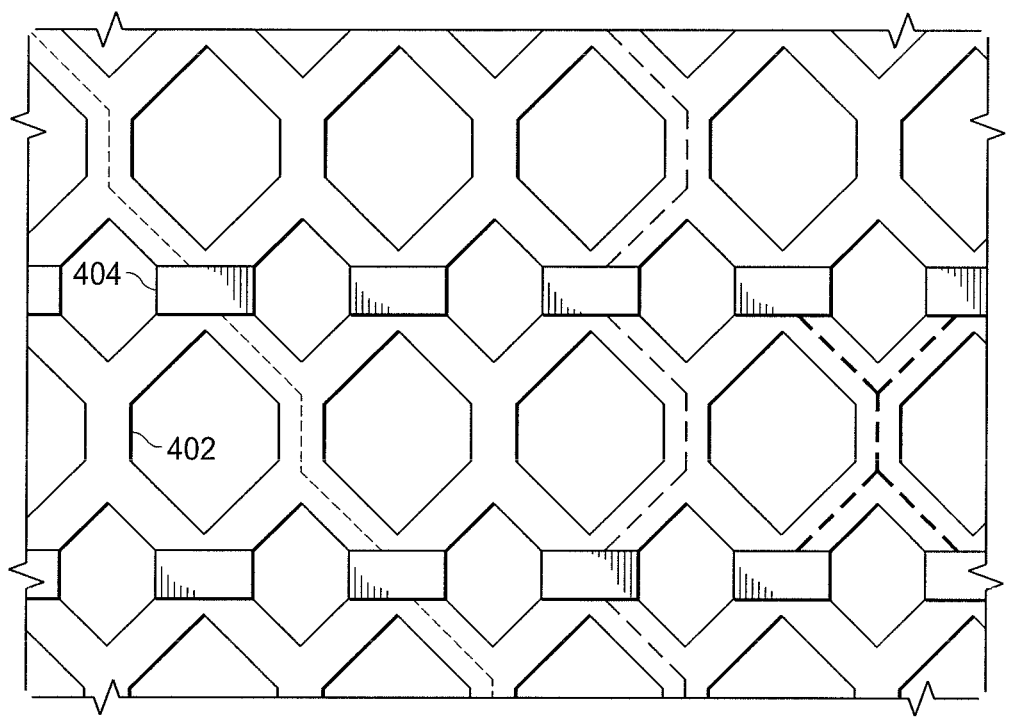
FIG. 5 is a magnified view of a portion of the illustrative switching network for the electrical impedance tomography apparatus.

The controller may also control the switch joints 402 coupled to the electrodes 404 to change the programmable helix angles. For example, turning to FIG. 5, which illustrates a magnified view of the switch joints 402, one joint may couple two electrodes on one cell diagonal, electrodes having a common axial grid position, electrodes having a common 25 circumferential grid position, and/or all four electrodes. In this way, multiple programmable switch joints 402 allows for flexibility in determining paths through the switchable array.

Figure 6:
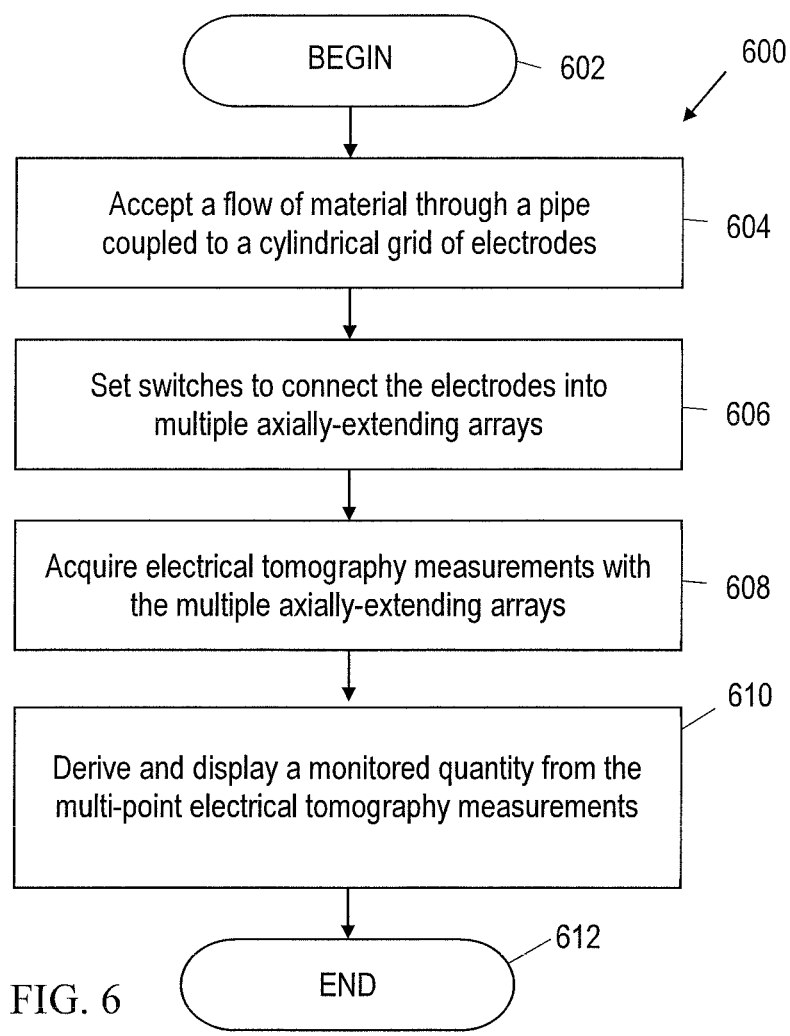
FIG. 6 is a flow diagram of an illustrative electrical impedance tomography method.

FIG. 6 is a flow diagram of an illustrative method 600 for using EIT to measure impedance and flow characteristics of one or more fluids beginning at 602 and ending at 612. At 604, a flow of material is accepted through a pipe having a cylindrical grid of m×n electrodes, where m is an integer greater than 3 representing a number of circumferential grid positions and n is an integer greater than 2 representing a number of axial grid positions. Each combination of adjacent circumferential grid positions and adjacent axial grid positions defines a cell having four electrodes electrically connectable in various combinations by a switch.

At 606, switches are set to connect the electrodes into multiple axially-extending arrays. Specifically, an axially-extending array may be created through the grid by consecutive electrodes that are switched on. For example, an axially-extending array may include electrodes arranged along a helix having a programmable helix angle, which may be changed by adjusting positions of the switches. In at least one embodiment, the programmable helix angle is be greater than an angle of one cell diagonal. In another embodiment, at least one of the multiple axially extending arrays may connect at least two electrodes having a shared axial grid position.

At 608, multi-point EIT measurements are acquired with the multiple axially-extending arrays. Acquiring the measurements may include applying a probe current between two of the multiple axially-extending arrays and measuring a response a voltage on at least two other of the multiple axially extending arrays. In at least one embodiment, acquiring the measurements includes concurrently applying at least two probe currents between different pairs of the multiple axially-extending arrays. The two probe currents may employ frequency multiplexing.

At 610, a monitored quantity is derived from the multi-point EIT measurements, using one of the published inversion techniques found in the relevant literature or any other suitable inversion method. Such processing may occur at the surface or downhole as desired. The derived quantity is displayed at the surface. Blocks 608, 610 are repeated to monitor the derived quantity over time. For example, the monitored quantity may be one or more of flow rate, fluid velocity, fluid acceleration, relative fluid velocity and acceleration compared with other regions, volumetric distribution of conductivity or admittivity, and the like. In order to display such quantities, a map may be created and displayed by dividing the pipe into a finite number of regions, each region having an impedance and flow characteristic determined by the measurements. The map may use colors and/or numbers to represent different impedance or flow characteristic variables in order to provide an easy-to-read overall picture of fluid flow within the pipe.

In at least one embodiment, an electrical impedance tomography based flow monitoring system includes a flow accepting pipe having a cylindrical grid of m×n electrodes, wherein m is an integer greater than 3 representing a number of circumferential grid positions and n is an integer greater than 2 representing a number of axial grid positions. Each combination of adjacent circumferential grid positions and adjacent axial grid positions defines a cell having four electrodes electrically connectable in various combinations by a switch, and the switches are set to connect the electrodes into multiple axially-extending arrays. The system further comprises a controller coupled to the multiple axially-extending arrays to acquire multi-point electrical tomography measurements, wherein the controller processes the measurements to derive a monitored quantity.

In another embodiment, an electrical impedance tomography based flow monitoring method includes accepting a flow of material through a pipe having a cylindrical grid of m×n electrodes, wherein m is an integer greater than 3 representing a number of circumferential grid positions and n is an integer greater than 2 representing a number of axial grid positions. Each combination of adjacent circumferential grid positions and adjacent axial grid positions defines a cell having four electrodes electrically connectable in various combinations by a switch. The method further includes setting the switches to connect the electrodes into multiple axially-extending arrays. The method further includes acquiring multi-point electrical tomography measurements with the multiple axially-extending arrays. The method further includes deriving a monitored quantity from the multi-point electrical tomography measurements. The method further includes displaying the monitored quantity.

The following features may be incorporated into the various embodiments. A user interface may be coupled to the controller to display the monitored quantity. The monitored quantity may be a volumetric distribution of conductivity or admittivity. The acquiring and deriving may be repeated over time, and the monitored quantity may be a flow rate for at least one component of a material having a distinctive admittivity. A probe current may be applied between two of the multiple axially-extending arrays, and a voltage may be measured on at least two other of the multiple axially extending arrays. Each of the multiple axially-extending arrays may have electrodes arranged along a helix having a programmable helix angle. The programmable helix angle may be zero. The programmable helix angle may be greater than an angle of one cell diagonal. At least one of the multiple axially extending arrays may connect at least two electrodes having a shared axial grid position. The controller may control the switches to change the helix angle of the multiple axially extending arrays. The various combinations may include electrically connecting only two electrodes on one cell diagonal, electrically connecting only those electrodes having a common axial grid position, electrically connecting only those electrodes having a common circumferential grid position, and/or electrically connecting all four electrodes. M may be at least 12 and n may be at least 12. A probe current may be applied between two of the multiple axially-extending arrays and measuring a response a voltage on at least two other of the multiple axially extending arrays. At least two probe currents may be concurrently applied between different pairs of the multiple axially-extending arrays. Two probe currents may employ frequency multiplexing. Each of the multiple axially-extending arrays may have electrodes arranged along a helix having a programmable helix angle. Positions of the switches may be adjusted to change the programmable helix angle. The programmable helix angle may be greater than an angle of one cell diagonal. At least one of the multiple axially extending arrays may connect at least two electrodes having a shared axial grid position.

While the present disclosure has been described with respect to a limited number of embodiments, those skilled in the art will appreciate numerous modifications and variations therefrom. It is intended that the appended claims cover all such modifications and variations.

What is claimed is:

1. An electrical impedance tomography based flow monitoring system, comprising:
    a flow accepting pipe coupled to a cylindrical grid of m×n electrodes, wherein m is an integer greater than 3 representing a number of circumferential grid positions and n is an integer greater than 2 representing a number of axial grid positions, with each combination of adjacent circumferential grid positions and adjacent axial grid positions defining a cell comprising four electrodes electrically connectable in various combinations by a switch, wherein the switches are set to connect the electrodes into multiple axially-extending arrays, wherein each of the multiple axially-extending arrays comprises electrodes arranged along a helix comprising a programmable helix angle, wherein respective helix angles of each of multiple axially-extending arrays are configured to vary along the axial direction of the pipe based at least in part on a shape and a curvature of the pipe, the switches forming hexagons that interconnect the electrodes such that flow paths extend along diagonal portions of the hexagons; and
    a controller coupled to the multiple axially-extending arrays to acquire multi-point electrical tomography measurements, wherein the controller processes the measurements to derive a monitored quantity.

2. The system of claim 1, further comprising a user interface coupled to the controller to display the monitored quantity.

3. The system of claim 1, wherein the monitored quantity is a volumetric distribution of conductivity or admittivity.

4. The system of claim 1, wherein the controller repeats the acquiring and deriving over time, and wherein the monitored quantity is a flow rate for at least one component of a material comprising a distinctive admittivity.

5. The system of claim 1, wherein the acquiring includes applying a probe current between two of the multiple axially-extending arrays and measuring a response a voltage on at least two other of the multiple axially extending arrays.

6. The system of claim 1, wherein the programmable helix angle is zero.

7. The system of claim 1, wherein the controller controls the switches to change the helix angle of the multiple axially extending arrays.

8. The system of claim 1, wherein the various combinations include electrically connecting only two electrodes on one cell diagonal, electrically connecting only those electrodes having a common axial grid position, electrically connecting only those electrodes having a common circumferential grid position, and electrically connecting all four electrodes.

9. The system of claim 1, wherein m is at least 12 and n is at least 12.

10. The system of claim 1, wherein the programmable helix angle is greater than an angle of one cell diagonal.

11. The system of claim 10, wherein at least one of the multiple axially extending arrays connects at least two electrodes sharing an axial grid position.

12. An electrical impedance tomography based flow monitoring method, comprising:
    accepting a flow of material through a pipe coupled to a cylindrical grid of m×n electrodes, wherein m is an integer greater than 3 representing a number of circumferential grid positions and n is an integer greater than 2 representing a number of axial grid positions, with each combination of adjacent circumferential grid positions and adjacent axial grid positions defining a cell comprising four electrodes electrically connectable in various combinations by a switch;
    setting the switches to connect the electrodes into multiple axially-extending arrays, wherein each of the multiple axially-extending arrays comprises electrodes arranged along a helix comprising a programmable helix angle, wherein respective helix angles of each of multiple axially-extending arrays are configured to vary along the axial direction of the pipe based at least in part on a shape and a curvature of the pipe, the switches forming hexagons that interconnect the electrodes such that flow paths extend along diagonal portions of the hexagons;
    acquiring multi-point electrical tomography measurements with the multiple axially-extending arrays;
    deriving a monitored quantity from the multi-point electrical tomography measurements; and
    displaying the monitored quantity.

13. The method of claim 12, wherein acquiring the measurements comprises applying a probe current between two of the multiple axially-extending arrays and measuring a response a voltage on at least two other of the multiple axially extending arrays.

14. The method of claim 12, further comprising adjusting positions of the switches to change the programmable helix angle.

15. The method of claim 12, wherein acquiring the measurements comprises concurrently applying at least two probe currents between different pairs of the multiple axially-extending arrays.

16. The method of claim 15, wherein the two probe currents employ frequency multiplexing.

17. The method of claim 12, wherein the programmable helix angle is greater than an angle of one cell diagonal.

18. The method of claim 17, at least one of the multiple axially extending arrays connects at least two electrodes sharing an axial grid position.

* * * * *